Aug. 25, 1936.  R. HULA  2,052,471
AGRICULTURAL AND INDUSTRIAL CAB FOR TRACTORS AND SIMILAR MACHINERY
Filed May 14, 1935  3 Sheets-Sheet 1

Fig. 1.

Inventor
Roger Hula
By Clarence A. O'Brien
Attorney

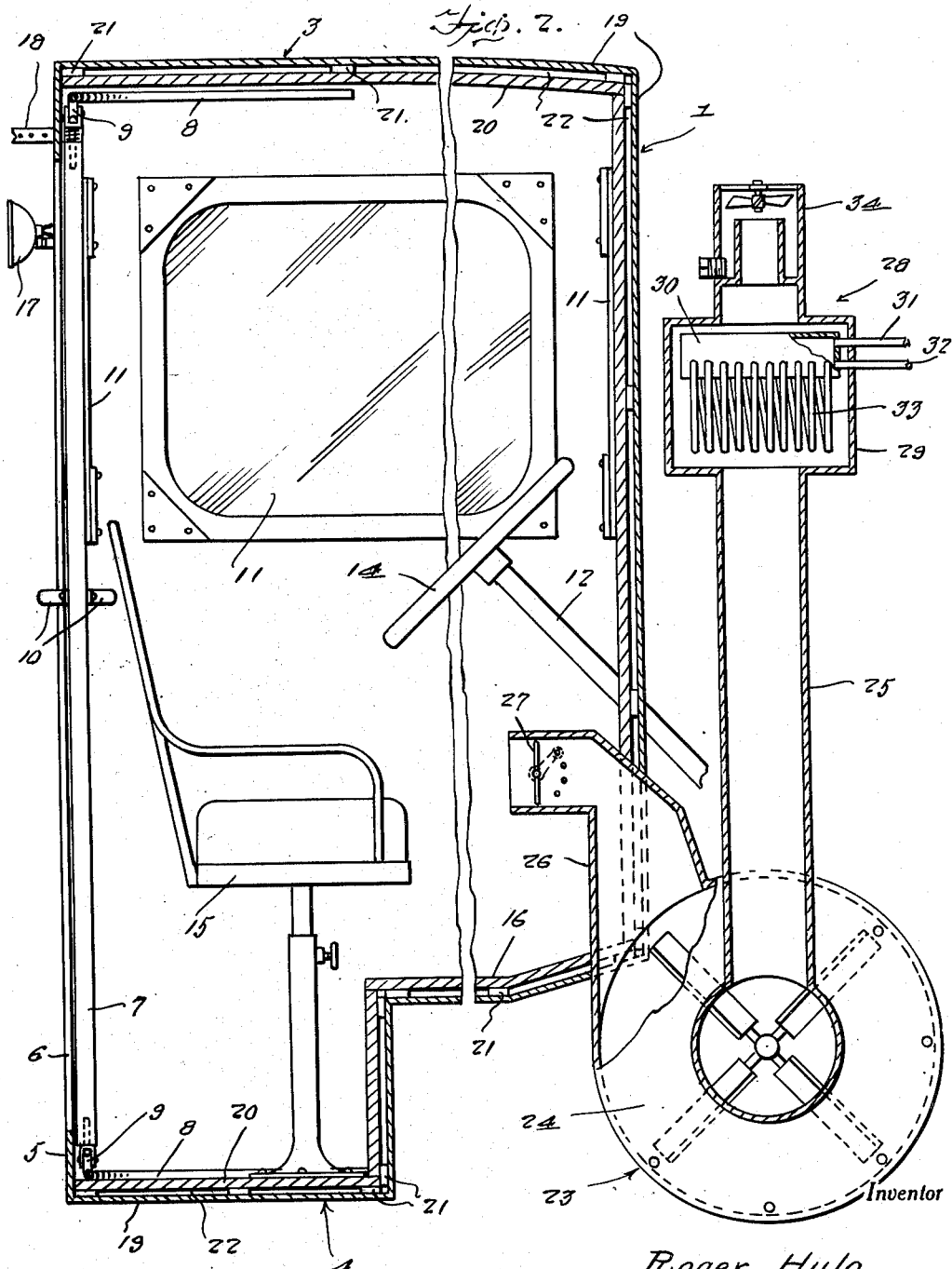

Aug. 25, 1936.   R. HULA   2,052,471
AGRICULTURAL AND INDUSTRIAL CAB FOR TRACTORS AND SIMILAR MACHINERY
Filed May 14, 1935   3 Sheets-Sheet 3
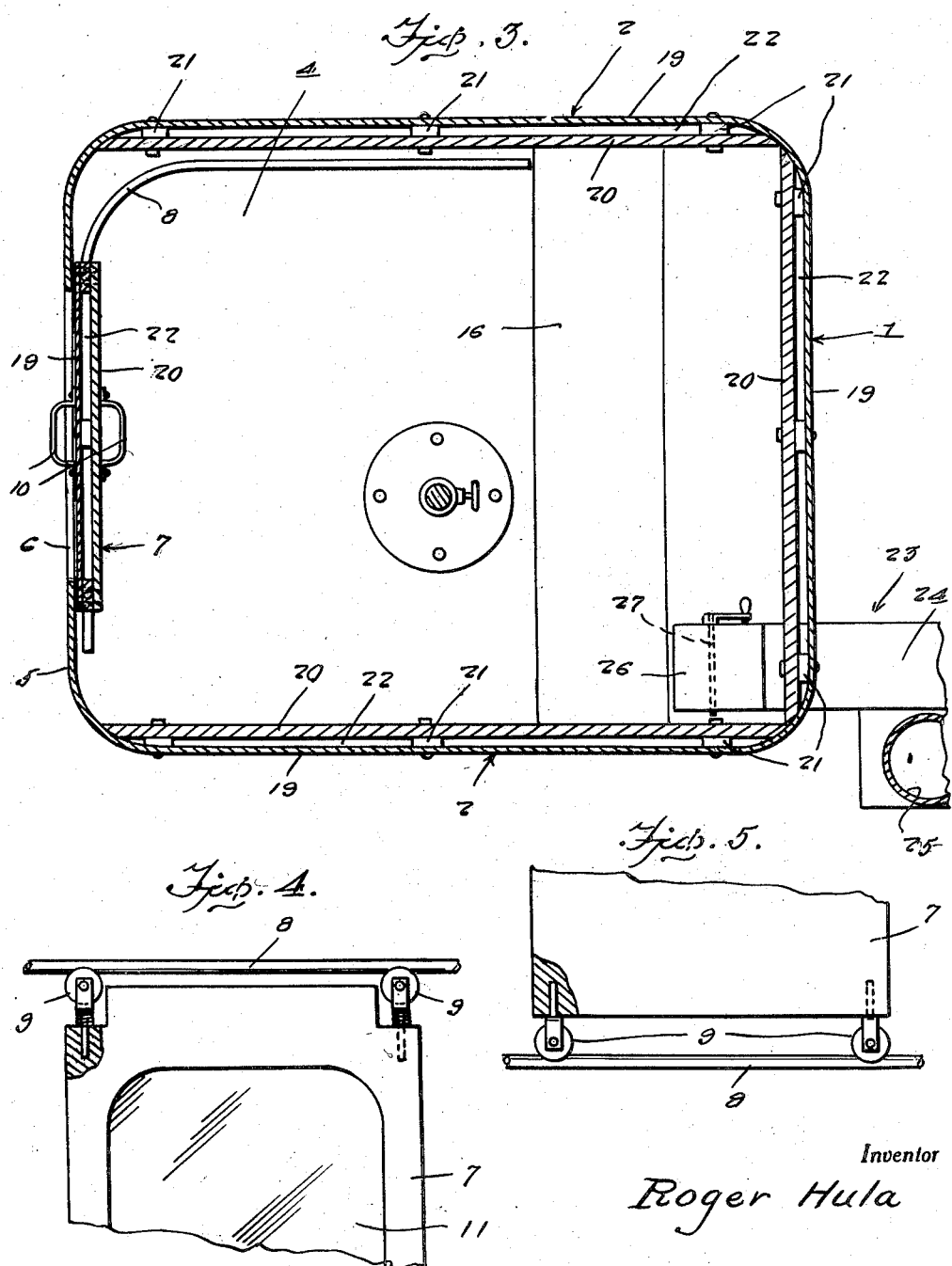
Inventor
Roger Hula
By Clarence A. O'Brien
Attorney Patented Aug. 25, 1936

2,052,471

UNITED STATES PATENT OFFICE 2,052,471

AGRICULTURAL AND INDUSTRIAL CAB FOR TRACTORS AND SIMILAR MACHINERY

Roger Hula, Medford, Okla.

Application May 14, 1935, Serial No. 21,444

1 Claim. (Cl. 296—47)

The present invention relates to new and useful improvements in agricultural and industrial cabs for tractors and similar machinery and has for one of its important objects to provide, in a manner as hereinafter set forth, a cab in the form of a unitary structure which is adapted to be expeditiously installed on a conventional tractor or similar machinery without the necessity of materially altering said tractor or other machinery structurally.

Another very important object of the invention is to provide a cab of the aforementioned character which will be sound, dust and moisture-proof and which is provided with an air conditioning apparatus with forced ventilation.

Other objects of the invention are to provide a cab of the character described which will be comparatively simple in construction, strong, durable, efficient and reliable in use, compact, light in weight, attractive in appearance and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1 is a perspective view showing a cab constructed in accordance with the present invention installed on a tractor.

Figure 2 is a view in vertical longitudinal section through the invention.

Figure 3 is a view in horizontal section through the cab.

Figure 4 is an elevational view of the upper portion of the slidable door, showing a portion broken away in section to illustrate the mounting of the upper rollers.

Figure 5 is an elevational view of the lower portion of the slidable door, one corner portion thereof being broken away in section.

Referring now to the drawings in detail, it will be seen that the embodiment of the invention which has been illustrated comprises a front, sides, top and bottom or floor which are designated generally by the reference numerals 1, 2, 3, and 4, respectively. The cab further includes a back 5 having formed therein a doorway 6 which is adapted to be closed by a sliding door 7. Angular tracks 8 extend across the rear and along one side of the cab at the top and bottom thereof upon which the door travels. The door 7 is mounted on the tracks 8 through the medium of grooved rollers 9 which are swivelly mounted in the upper and lower ends of said door 7, the upper rollers being spring actuated, as best seen in Figure 4 of the drawings. Handles 10 are provided on the door 7.

The front 1, sides 2 and the door 7 of the cab are provided with plate glass windows 11. The steering column 12 of the tractor 13 projects upwardly through the front 1 and, of course, has mounted thereon the steering wheel 14. The reference numeral 15 designates a vertically adjustable operator's seat mounted on the floor or bottom 4. The forward portion of the floor 4 is raised in a manner to provide a platform 16 (see Figure 2) for the feet of the operator. Suitable lights 17 are mounted on an upper portion of the rear 5 of the cab. Also mounted on the upper portion of the rear of the cab is a support 18 for a shade or visor.

As illustrated to advantage in Figures 2 and 3 of the drawings, the front 1, side walls 2, the top 3, the bottom 4 and the door 7 of the cab comprise outer and inner walls 19 and 20, respectively, which are spaced from each other through the medium of spacers 21 in a manner to provide confined air chambers or spaces 22 therebetween. The outer walls 19 are of suitable metal, preferably construction steel of the desired thickness. The inner walls 20 are of fibrous insulating material suitably treated in a manner to render said inner walls substantially air and moisture-proof. If desired, the confined air chambers 22 may be eliminated in the floor or bottom 4 of the cab.

Mounted adjacent one of the forward corners of the cab is an air conditioning unit designated generally by the reference numeral 23. The unit 23 includes a centrifugal fan 24 having a vertical tube 25 connected centrally to the casing thereof. Extending from the centrifugal fan 24 into the cab is a discharge 26 having a butterfly control valve 27 mounted therein. Mounted on the upper end of the air tube 25 is an air warming or cooling device designated generally by the reference numeral 28 and comprising a casing 29 having mounted in the upper portion thereof a tank 30 to which water supply and discharge pipes 31 and 32 are connected.

Coils 33 are connected to the tank 30 and depend therefrom. Rising from the casing 29 is an air filter or cleaner 34.

From a consideration of the foregoing it is believed that it will be apparent that a cab has been provided which may be conveniently installed on conventional tractors. The discharge of conditioned air into the cab is controlled as desired by the operator through the medium of the adjustable butterfly valve 27. The fan 24 of the unit 23 is connected in any suitable manner to the power plant of the tractor for actuation thereby. With the door 7 in closed position, a substantially sound, weather and dust-proof cab is provided. When opened, the door 7 is in an out-of-the-way position closely adjacent one of the side walls 2 of the cab. The cab may be secured to the tractor in any suitable manner, it being preferable to use rubber cushions at the securing points to absorb vibration. Mudguards 35 are provided on the side walls 2 of the cab for protection against the tractor wheels 36.

It is believed that the many advantages of a tractor cab constructed in accordance with the present invention will be readily understood, and although a preferred embodiment of the invention is as illustrated and described, it is to be understood that changes in the details of construction and in the combination and arrangement of parts may be resorted to which will fall within the scope of the invention as claimed.

What is claimed is:—

A cab of the class described comprising, in combination, a front, side walls, a top, a bottom and a rear wall, the latter having a doorway therein, angular tracks mounted adjacent the top and the bottom and extending adjacent the rear wall and one of the side walls, said tracks being circular in vertical cross-section, a door operable on said tracks, said door being rectangularly shaped, the upper corners thereof being recessed, rollers swivelly mounted in said recess portion and extending upwardly beyond the upper edge of said door, spaced rollers swivelly mounted on the lower portion of said door, said swivelly mounted rollers being engageable with and ridable on the lower track, and resilient means urging the upper swivelly mounted rollers to pressure engaging contact with the upper track.

ROGER HULA.